UNITED STATES PATENT OFFICE.

HENRY D. BAUMGARTEL, OF CHICAGO, ILLINOIS.

LIQUID COATING COMPOSITION AND PROCESS OF MAKING SAME.

1,257,783.

Specification of Letters Patent. Patented Feb. 26, 1918.

No Drawing. Application filed December 24, 1915. Serial No. 68,538.

*To all whom it may concern:*

Be it known that I, HENRY D. BAUMGARTEL, a citizen of the United States, residing at Chicago, in the county of Cook and State of Illinois, have invented a certain new and useful Improvement in Liquid Coating Composition and Processes of Making Same, of which the following is a full, clear, concise, and exact description.

The invention relates to a liquid coating composition which may be applied to a glass negative or film, to produce a surface thereon which resembles and effects a substitute for ground glass, which is of particular use in the art of photography, although the same may be otherwise very satisfactorily employed.

In compounding the material certain ingredients are utilized which form a substantially hard surface which can be operated upon, or removed when occasion requires that either shall be done.

In the description herein I will confine myself particularly to the application of the invention in its use to photographic plates, films, etc., although as before stated, it is not so limited in its scope. It is a prime object of my invention to produce a composition which may be readily applied to the plate or film, preferably in a fluid state and which when dry will adhere to the surface thereof, and produce a surface, which will permit of it being operated upon to intensify or reduce a particular portion or the whole of the print made from the plate or film.

A further object is the production of a composition of this character which will produce a substantially tough, or resilient texture which will not be easily removed by any ordinary method; also to produce a composition wherein the tooth and the grain may be varied to suit the user. I also contemplate the use of coloring matter, which may be mixed with the fluid and thereby further either soften or increase the contrast of the print or image produced from a plate coated with the substance formed of this composition. It will be understood that all photographic printing papers are more sensitive to blue or violet rays of the spectrum. Therefore, I utilize coloring matter in the above formula to permit the blue or red rays to be let through or held back, as desired, thereby improving the print which would ordinarily result from an otherwise defective negative. The formula results in a coating in which the grain is greatly more uniform; this makes the addition of the dyes practical. When a plate or film is used in which the film is of a thinner quality than ordinary, the print which would result from a negative of this character will be found to have a flat appearance, and to improve the brilliancy of such a print, an orange, yellow, or red coloring matter is introduced which holds back a certain percentage of the blue rays of the spectrum, thereby increasing the exposure, and allowing the light to penetrate more deeply into the emulsion of the printing paper, thereby adding more brilliancy or contrast to the print made from a negative which is coated with the colored composition. When a negative is found to be of a strong character, that is one from which the print would show too much contrast, and it is desired to soften same, a blue dye would be used in the coating or ground glass substitute, which will prevent the orange or yellow rays from passing through too rapidly, thus resulting in a softer toned print. Crayon may be also applied to certain portions of the plate, thereby further hindering the light rays and resulting in a still softer tone to that particular part of the print.

Another advantageous result which is gained by my invention is that a composition is produced which readily flows uniformly over the entire surface which is desired to be coated, thereby eliminating the possibility of some portions of an image being more distinct than others in places where no distinction is required, thus rendering the same unfit for any commercial value. The composition formed or the ingredients utilized, results in a substance which adheres to the surface to which it is applied, flows smoothly over the surface to be coated, and which dries quickly after its application, and which also forms a substance whose working surface is uniform both in tooth and grain throughout the surface to which it is applied. The composition has a further advantage in that it results in a substance which permits the uniform distribution of different strata of material over the entire surface to be coated. It will be understood that either the tooth or grain of the substance formed by the material may be varied to suit the convenience of different users. The use of the term tooth in this connection signifies the depth of the particles which form the surface upon which a certain operation is performed to gain a certain result; whereas the term grain signifies the working area of each of the particles of which the whole surface is composed. A further advantage is that a composition is produced which is superior in texture, the particles which compose the surface being substantially uniform in area and thickness and which adhere to the surface more firmly. The tone of the print as a whole may also be regulated or varied if desired, this being accomplished by the introduction of coloring materials or agents into the composition. The fine grain and uniformity of this formula makes the use of dyes practical. The component parts of the composition may be varied to result in a surface of different textures by varying the relative amounts of the several ingredients of which the solution is formed, only one form being herein specifically set forth which is composed of proportions and ingredients substantially as follows: concentrated ether 60 oz., wood alcohol 8 oz., pulverized gum mastic 1½ oz., gum sandarac 3½ oz., benzol 30 oz., and when this mixture is desired to be colored, dye stuff will be added in various proportions, ordinarily about 5 grains of coloring matter will be found sufficient to color one pound of the solution. From the foregoing it will be evident that these ingredients when mixed will produce a composition which will dissolve perfectly, flow freely, and have sufficient body when applied to the surface to be coated which will dry quickly.

In compounding the mixture I have found it convenient to mix the concentrated ether and the alcohol together, these forming the solvent and evaporating agents, then to mix these with the gums which form the base, and which have been previously mixed together, agitate the mixture until the gums are dissolved, and then add the benzol slowly, and if color is desired add the required amount as the last step. It will be understood that different grades of the composition may be obtained by varying the amounts of each or all of the ingredients of which the composition is formed, for instance, by varying the amount of alcohol, the toughness and tooth of the mixture may be changed, also the grain may be changed, by varying the amount of benzol. When this mixture composed as specified, is utilized it has been found that two strata of material are produced upon the surface which is coated, that is, the portion forming the ground glass effect will adhere to the surface of the glass or film and the substance which forms the tooth and grain will be outermost, thus forming a surface upon which the desired work may be done. As before stated, color may be added when desired, and it has been found that when the same is added to these substances the particles of which the substance is formed are thoroughly impregnated thereby and result in a coating which is uniform and lasting in color when applied to the plates. It has further been found that by adding such colors as yellow or blue that the first named color will tend to increase the contrast in the print and that a color such as blue will tend to soften the print or image produced by the plate or film coated with a colored substance. As before stated, the invention is particularly adapted for use in the art of photography and therefore I will explain one of its uses in that connection.

Presume that a negative is desired to be altered, so that some part of the print will be subdued or caused to be pronounced, with relation to the other parts. This can readily be done by coating the smooth or glass side of the negative with the solution which as before stated produces a grained surface, which readily lends itself to take such material as crayon, etc., which when the same is of the proper color and applied offers an obstacle to the light rays, which hinders their penetration, or same may be wholly prevented from passing therethrough, as desirable. This will cause the covered feature to be brought out and contrasted with respect to the other portions of the print. When the reverse result is desired, that is some high light is desired to be brought out more in detail, the material formed by the solution will be removed from the plate at the desired place. This will of course permit the light to travel through the negative unhindered at this point; the remaining portion of the plate being coated will hinder the light to the desired extent and permit the uncovered portion to bring out details which ordinarily would not be noticed.

From the foregoing explanation of the composition, a surface is provided which is of an even texture, will run smoothly over the surface which is to be coated, adhere firmly thereto, and result in a substance which will cause a more brilliant or softer print, and also permit some portions of the print to be more subdued, and others to be brought out more pronounced, according to the desires, thus forming a decided advantage in the art to which the same pertains; also that the invention permits of the use of analogous constituents and variations to obtain different degrees of texture, all of which are contemplated by me.

Having thus explained the constituent parts of which one form of the composition is composed for the accomplishment of the desired end, what I claim as new and desire to secure by Letters Patent is:

1. A liquid coating composition comprising concentrated ether, wood alcohol, gum mastic, gum sandarac and benzol substantially in the proportions described.

2. A liquid coating composition comprising concentrated ether, 60 ounces, wood alcohol 8 ounces, pulverized gum mastic 1½ ounces, gum sandarac 3½ ounces and benzol 30 ounces.

3. A liquid coating composition comprising concentrated ether, benzol, wood alcohol, gum sandarac, and gum mastic, which decrease respectively in amounts from said ether to the gum mastic.

4. A method of producing a colored liquid coating composition composed of ether, wood alcohol, gums, benzol, and coloring matter which consists of first mixing said ether and alcohol together, mixing this with said gums which have been previously mixed, agitating said mixture of ether, alcohol and gums until said gums are dissolved, then slowly add said benzol, and lastly adding said coloring matter.

5. A composition of matter comprising concentrated ether, wood alcohol, gum mastic, gum sandarac, benzol and coloring matter substantially in the proportions described.

6. A method of producing a liquid coating composition composed of ether, wood alcohol, gums and benzol, which consists of first mixing said ether and alcohol, mixing this with said gums which have been previously mixed, agitating said mixture of ether, alcohol and said gums until said gums are dissolved, and then slowly adding said benzol.

In witness whereof, I hereunto subscribe my name this 15th day of December, A. D. 1915.

HENRY D. BAUMGARTEL.

Witnesses:
 HAZEL A. JONES,
 OTTO M. WERMICK.